(12) United States Patent
Kelso et al.

(10) Patent No.: US 6,896,109 B2
(45) Date of Patent: May 24, 2005

(54) MAGNETORHEOLOGICAL FLUID VIBRATION ISOLATOR

(75) Inventors: Shawn P. Kelso, Albuquerque, NM (US); Jason E. Lindler, Mountain View, CA (US)

(73) Assignee: CSA Engineering, Inc., Mountain View, CA (US)

( * ) Notice: Subject to any disclaimer, the term of this patent is extended or adjusted under 35 U.S.C. 154(b) by 0 days.

(21) Appl. No.: 10/408,040

(22) Filed: Apr. 7, 2003

(65) Prior Publication Data

US 2004/0195061 A1 Oct. 7, 2004

(51) Int. Cl.$^7$ ................................................. F16F 9/53
(52) U.S. Cl. .......................... 188/267.1; 188/267.2; 267/140.14
(58) Field of Search .................... 188/267, 267.1, 188/267.2; 267/140.14, 140; 11/11

(56) References Cited

U.S. PATENT DOCUMENTS

| | | | |
|---|---|---|---|
| 4,624,435 A | * | 11/1986 | Freudenberg ............... 248/550 |
| 4,815,574 A | | 3/1989 | Taylor et al. |
| 4,838,392 A | | 6/1989 | Miller et al. |
| 5,176,368 A | * | 1/1993 | Shtarkman ............. 267/140.14 |
| 5,277,281 A | | 1/1994 | Carlson et al. |
| 5,284,330 A | | 2/1994 | Carlson et al. |
| 5,344,128 A | * | 9/1994 | Kobayashi et al. .... 267/140.14 |
| 5,398,917 A | | 3/1995 | Carlson et al. |
| 5,492,312 A | | 2/1996 | Carlson |
| 5,540,549 A | * | 7/1996 | McGuire ..................... 416/140 |
| 5,820,113 A | * | 10/1998 | Laughlin ................ 267/140.15 |
| 5,878,851 A | | 3/1999 | Carlson et al. |
| 5,957,440 A | * | 9/1999 | Jones et al. ............. 267/140.14 |
| 6,095,486 A | | 8/2000 | Ivers et al. |
| 6,158,470 A | | 12/2000 | Ivers et al. |

FOREIGN PATENT DOCUMENTS

| | | | |
|---|---|---|---|
| EP | 297608 | * | 1/1987 |
| JP | 55112440 | * | 8/1980 |

* cited by examiner

Primary Examiner—Robert A. Siconolfi
Assistant Examiner—Devon Kramer
(74) Attorney, Agent, or Firm—Rick G. Brewster (57) ABSTRACT

The invention disclosed is a magnetorheological fluid device offering vibration isolation and broad modulation range damping in a high load carrying and compact form. A cylindrically shaped flexure structure has a bottom cap attached to one end and a top cap attached to the other end. A piston comprising a toroidal displacement body, a central shaft, and intermediate connecting plate, attaches to the top cap. A fluid chamber surrounding and generally conforming to the shape of the toroidal displacement body, is attached to the bottom cap. Two bellows attaching between the piston connecting plate and top and bottom portions of the fluid chamber complete an enclosed volume around the toroidal displacement body and allow frictionless motion of the toroidal displacement body relative to the fluid chamber. Electromagnetic coils placed within the inner and outer radius walls of the fluid chamber effect a magnetic field across the outer radius gap and inner radius gap between the toroidal displacement body and fluid chamber. Longitudinal deflection of the cylindrical flexure structure effects motion of the top cap relative to the bottom cap which in turn effects longitudinal motion of the toroidal displacement body within the fluid chamber. Magnetorheological fluid is forced from the top of the toroidal displacement body to the bottom, and vice-versa, across the inner radius and outer radius gaps between the fluid chamber and the inner radius of the toroidal displacement body. Static payload loads are supported with a high-strength, linear-elastic load path while base motion dynamic vibration loads are substantially isolated and damped without stiction effects.

17 Claims, 13 Drawing Sheets

MAGNETORHEOLOGICAL FLUID VIBRATION ISOLATOR

STATEMENT REGARDING FEDERALLY SPONSORED RESEARCH

This invention was made with U.S. Government support under Contract No. NRO000-01-C-4374. The U.S. Government has certain royalty-free rights in this invention.

BACKGROUND OF THE INVENTION

The present invention relates to damping mechanisms and vibration isolation mechanisms. More particularly, the present invention pertains to a high-strength, compact, magnetorheological-fluid-modulation-damped vibration isolator.

The use of magnetorheological (MR) fluid in a damping device allows for the controlled variance of device damping as a function of the strength of a magnetic field induced into a controlled or valved region of the MR fluid. Coil electromagnets, permanent magnets, or a combination of magnet types are used as the means for magnetic field creation. The use of coil electromagnets allow for the variance of the magnetic field with the variance of the electrical signal amplitude applied to the coil. Many devices exist within the prior art that take advantage of this smart material capability of MR fluids.

Problems present in MR fluid damping devices of the prior art include fluid leakage and rapid seal wear in devices incorporating dynamic type sealing, i.e. where surfaces slide over one another such as a piston rod sliding through a concentric lip seal. The maintenance of good lateral alignment of the moving components of the damper relative to the fixed components and the support of off-axis moment loading is also problematic within devices of the prior art. Tighter seals and bushings are often used for improved alignment and moment support but cause greater friction loads and stiction effects between the moving components. Devices of the prior art have thereby been relatively intolerant to off-axis moment loading.

An example of the prior art usage of magnetorheological fluid in a damping device where dynamic seals are relied upon is seen in U.S. Pat. No. 5,277,281. Therein a damper assembly is filled with MR fluid and an electromagnetic coil is contained within the damper piston. The viscosity of the MR fluid flowing past the piston is varied by varying the magnetic flux around the piston by means of an electromagnetic coil mounted within the piston. In an alternative embodiment of that patent, two tubes are utilized, one concentric to the other, wherein a piston forces fluid out of the inner tube and into the outer tube across a valved area controlled by a stationary coil at the end of the tubes. In both these embodiments, dynamic sealing is relied upon around the piston shaft.

Bellows type sealing and relative motion provision within a fluid damper have been described in U.S. Pat. No. 4,815,574. Therein a bellows surrounds a piston shaft and thereby prevents damping fluid from contacting the piston shaft at its protrusion from the surrounding damper cylinder. Lateral alignment of the piston shaft and guidance within the cylinder are still, nevertheless, accomplished with a bushing at the end plate through which the piston shaft passes. Friction forces and stiction develop at this bushing, and lateral alignment of the piston within the cylinder is controlled largely by the lateral forces developed on the piston by the cylinder wall, further adding to friction and stiction effects. Additionally, this device does not provide for static load carrying except at the end of travel points of the piston.

Often damping mechanisms of the prior art offer damping capability only and do not provide static load carrying capability. This is the case with the patents described above which require the dampers to be placed in parallel with static load carrying, vibration motion isolating members, such as coil or leaf springs or elastomeric mounts. The support structure for a payload thereby requires significantly greater space and attachment hardware than that afforded by a single device offering both damping and load carrying integrally.

Dampers which do provide integral static load carrying capability commonly use elastomeric elements in the primary load path of the device. U.S. Pat. No. 5,398,917 shows an example of a MR fluid damper incorporating an elastomeric element to serve as a spring for vibratory motion isolation. U.S. Pat. No. 5,284,330 describes an MR fluid damper wherein elastomeric elements are used to allow the relative motion between a piston and its surrounding cylindrical fluid chamber. Similarly, U.S. Pat. No. 5,492,312 uses elastomerics to allow relative motion of a central shaft and piston relative to a surrounding fluid confining cylinder. In these devices the elastomeric elements do provide a static load path within the device. The drawbacks with the use of elastomeric elements, however, are the non-linear load/deflection characteristics imparted to the device and the relatively low strength capabilities of the elastomeric elements which limit the static load carrying capability of the device.

Applications in aerospace payload support commonly require damper and vibration isolator mechanisms to have as low a profile as possible so to minimize the lengthening of the overall spacecraft structure. It is often desirable to insert a damping and vibration isolation support mechanism within the existing interface of a payload and its support structure. The desire for low profile, compact structures adds value to devices which maximize the damping force effected for a given length of damper. The elimination of stiction in device performance also becomes of premium value where precise motion control and positioning of a payload is desired. Mechanical robustness, reliability, and predictability of performance are additional qualities required of airborne devices.

Notwithstanding the many devices of the prior art utilizing magnetorheological fluid for damping, there remains a need for a device that combines within a single, low profile, compact package, the wide range of damping controllability of a magnetorheological fluid damper along with high strength and optionally linear-elastic load carrying capability accompanied with substantial vibration and shock load isolation. The device should also avoid the stiction and high wear sealing problems associated with dynamic seals prevalent in MR fluid devices of the prior art. The invention described herein provides for such a device.

BRIEF SUMMARY OF THE INVENTION

The invention disclosed is a magnetorheological fluid device offering vibration isolation and magnetorheological fluid modulated damping in a high load carrying and compact form. The device effects a novel integration of high strength, medium-to-low frequency vibration isolation with high value, variable damping and does so in a more compact combination than magnetorheological devices of the prior art. It further does so without the need for dynamic seals. Importantly, the invention obviates the presence of any wear surfaces from existing in contact with the commonly abrasive magnetorheological fluid.

In a preferred embodiment the device is comprised within a short, cylindrical package and can be used singly or in multiplicity for mounting a payload and providing a variable and controllable damping level in combination with substantial vibration isolation. In the embodiment the device is comprised of a cylindrically shaped flexure structure which in addition to serving as a flexure structure also serves to house and laterally position align and stabilize the components of a magnetorheological fluid damper. A bottom cap attaches to the bottom end of the cylindrically shaped flexure structure and a top cap attaches to the top end. The top and bottom caps move relative to one another, primarily along the longitudinal axis of the cylindrical flexure structure and thus allow for attenuation of vibration through the device. One end cap serves for mounting of a payload and the other for mounting to a base or payload supporting structure. The flexure structure of the preferred embodiment is a machined, multi-layer opposed beam structure that allows for relatively high compliance with high strength, linear-elastic materials, such as aluminum, titanium or steel. The use of elastomerics in the load path of the device, as is common with isolators of the prior art, is avoided.

The top and bottom caps serve to provide a parallel load path between the payload and the payload supporting structure. The first load path is as described above which is through the cylindrical flexure structure. The second load path is through the magnetorheological fluid damping portion of the device. In the damping portion, to the top cap is mounted a piston which moves within a fluid chamber that is mounted to the bottom cap. The piston is comprised of a central connecting shaft, a connecting plate, and a toroidal displacement body. The connecting shaft is attached at one end to the interior surface of the top cap and at the other end to the connecting plate. The connecting plate extends radially outward from the connecting shaft and supports the toroidal displacement body. To the bottom cap, radially interior to the attachment to the cylindrical flexure structure, a fluid chamber is mounted. The fluid chamber forms a somewhat more elongated, toroidal cavity around the toroidal displacement body of the piston and encloses the toroidal displacement body completely except for a clearance space on the inner radius between top and bottom portions of the fluid chamber. Through this clearance space passes the connecting plate which supports the toroidal displacement body within the fluid chamber to the connecting shaft outside of the fluid chamber.

The magnetorheological damping portion of the device also serves as a means to significantly vary the effective stiffness of the device. The application of a strong magnetic field to the damping portion and resulting stark increase in effective viscosity of the MR fluid effectively locks the top cap to the bottom cap via the piston and fluid chamber structure and thus causes the stiffness of the second load path to increase dramatically such that it is much higher than that in the first load path. The overall device stiffness can thus be varied from a relatively low stiffness level where the flexure structure stiffness governs to a much higher overall device stiffness where the serial stiffness of the top cap, piston, and bottom cap govern.

The clearance space in the inner radius wall of the fluid chamber is enclosed by use of two bellows. A first bellows attaches and seals between the bottom portion of the fluid chamber and the bottom surface of the connecting plate. A second bellows attaches and seals between the top portion of the fluid chamber and the top surface of the connecting plate. The two bellows thus attached between the connecting plate and their respective portions of the fluid chamber allow for longitudinal movement of the piston and its toroidal displacement body within the fluid chamber and provide for sealing of the toroidal displacement body within the fluid chamber without the use of dynamic seals.

The top and bottom caps being laterally aligned by the short, laterally stiff, cylindrical flexure body, provide for the lateral alignment of the piston and toroidal displacement body relative to the fluid chamber. The toroidal displacement body, being part of the piston connected to the top cap, thus moves up and down in the fluid chamber with the movement of the top cap relative to the bottom cap as allowed for through the longitudinal compliance of the cylindrical flexure structure.

In the preferred embodiment electromagnetic coils are positioned in the radially inner and outer walls of the fluid chamber such to induce a magnetic field in the volume of the magnetorheological fluid surrounding the toroidal displacement body. In the longitudinal motion of the top cap relative to the bottom cap, the toroidal displacement body displaces magnetorheological fluid from the top of the toroidal displacement body to the bottom of the body, and vice-versa, through a gap between the walls of the fluid chamber and the surfaces of the toroidal displacement body. The effective or that is apparent viscosity of the magnetorheological fluid is varied by varying the electrical current supplied to the coils and thus varies the effective damping of the device. The damping and stiffness of the device and the support of the payload overall can thus be tuned to minimize or change the fundamental resonance modes associated with a payload mounted to a vibration isolation support.

BRIEF DESCRIPTION OF THE DRAWINGS

The operation of this invention can be best visualized by reference to the following drawings described below.

DETAILED DESCRIPTION OF THE INVENTION

Described in detail below is a magnetorheological fluid device offering vibration isolation and magnetorheological fluid modulated damping in a high load carrying and compact form. In the description, for purposes of explanation, many specific details are set forth in order to provide a thorough understanding of the present invention. However, the present invention may be practiced without these specific details, as would be obvious to one skilled in the art.

Figure 1:
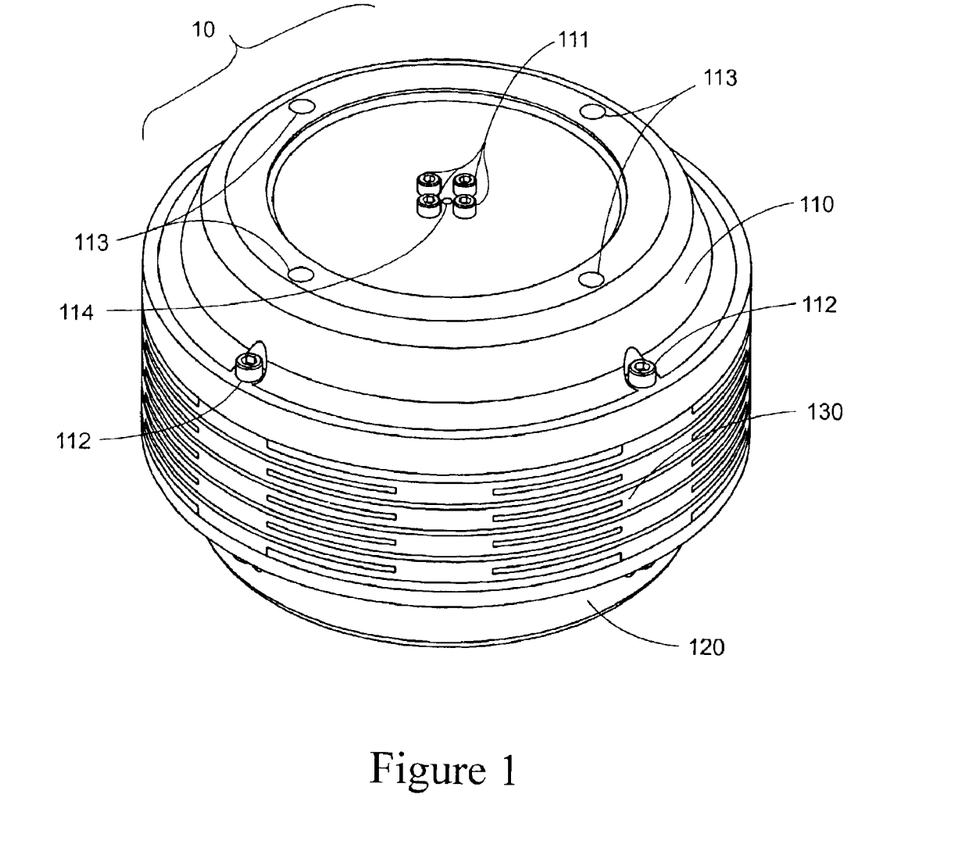
FIG. 1 is an isometric view of a magnetorheological fluid device in accordance with an embodiment of the invention.
Figure 2:
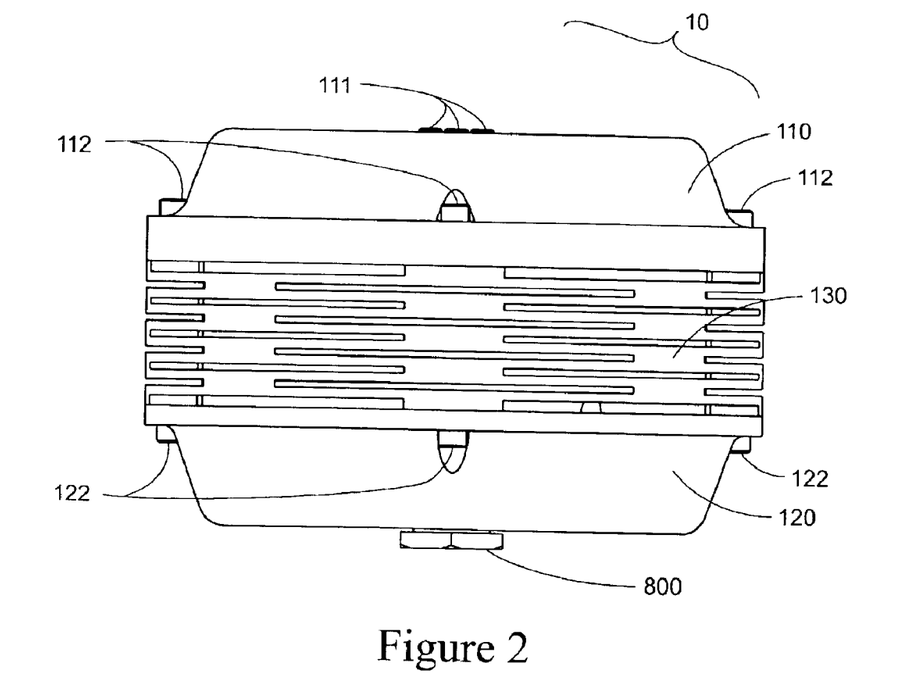
FIG. 2 is a side view of the magnetorheological fluid device shown in FIG. 1 in accordance with an embodiment of the invention.

A magnetorheological fluid modulation damped vibration isolator (MRFMD isolator) 10 is depicted in isometric view in FIG. 1 and in side view in FIG. 2 in accordance with an embodiment of the invention. The exterior of the MRFMD isolator 10 is comprised of a low profile cylindrical flexure structure 130 having a top end cap 110 and bottom end cap 120 mounted at the two ends of the flexure structure.

Figure 3:
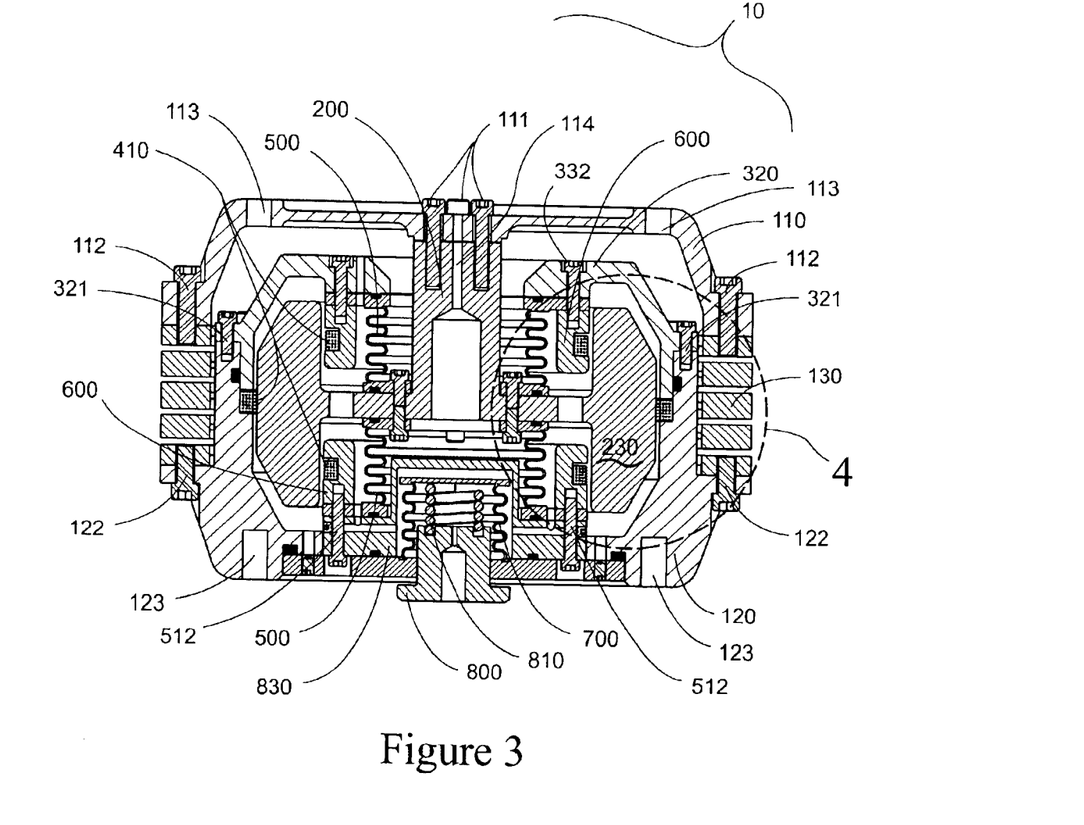
FIG. 3 is a cross section view of the magnetorheological fluid device shown in FIG. 1 in accordance with an embodiment of the invention.

FIG. 3 shows a cross section view of the MRFMD isolator 10. The internal, damping element components and features of the MRFMD isolator are described further and separately in the following paragraphs.

Figure 5:
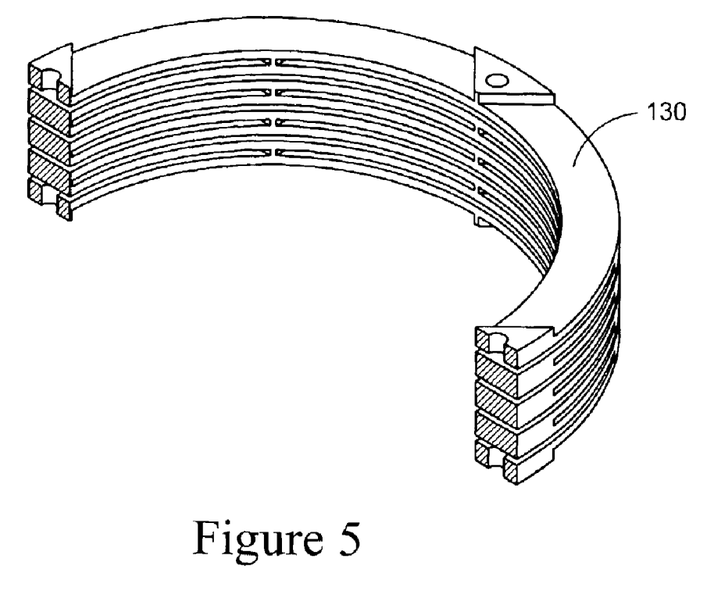
FIG. 5 is a cutaway view of a cylindrical flexure structure comprised within the magnetorheological fluid device shown in FIG. 1 in accordance with an embodiment of the invention.

The flexure structure 130, as seen in FIGS. 1 through 3 and shown further in cutaway view in FIG. 5, provides for the lateral alignment of the internal damping components of the MRFMD) isolator while allowing longitudinal displacement of the top and bottom end caps 110 and 120 relative to one another for vibratory motion and load isolation. The end caps 110 and 120 provide for mounting of the device between a payload and payload support structure with minimal additional mounting height to the overall payload. It is iterated that the flexure structure 130 described is of the particular embodiment depicted in FIGS. 1–3, and 5. In further embodiments flexure structure 130 is replaced with other structural forms constituting a lateral alignment and moment resisting mechanism and are configured external to the magnetorheological fluid volume.

Figure 4:
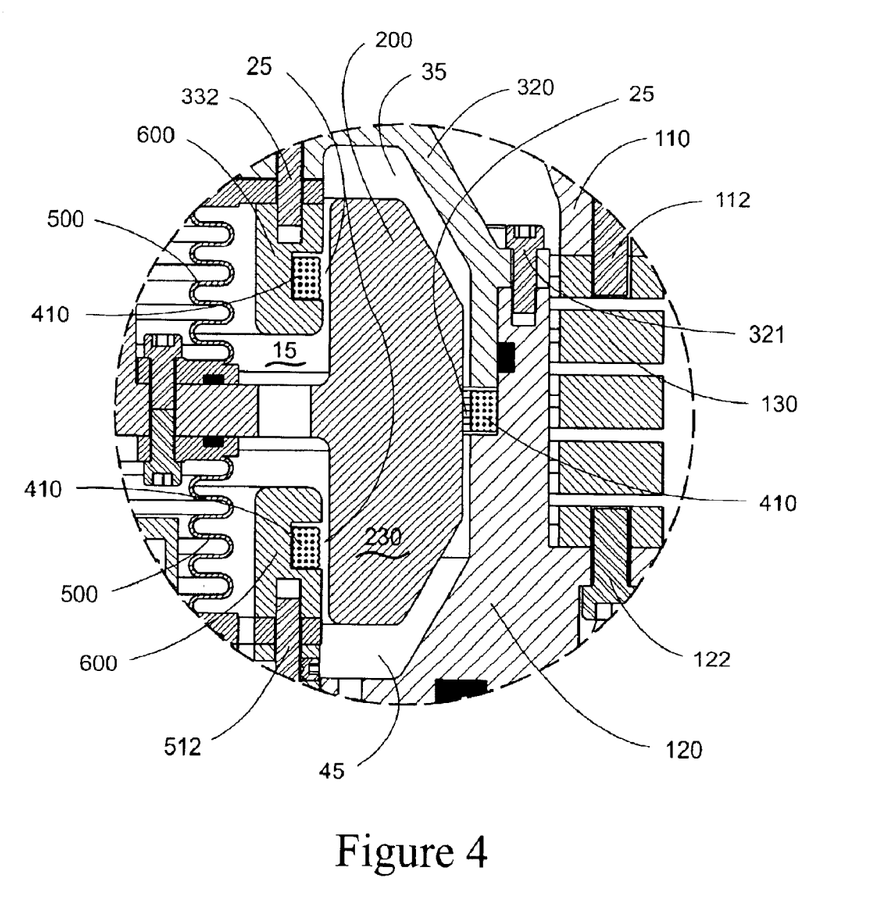
FIG. 4 is a detailed cross section view of the fluid chamber area of the magnetorheological fluid device shown in FIG. 1 in accordance with an embodiment of the invention.

The cross section view of FIG. 3 and the fluid chamber detailed cross section view of FIG. 4 further show the relationship of the various internal components relative to the external features seen in FIGS. 1 and 2, in accordance with an embodiment of the invention. Piston 200 mounts to the top end cap 110 and thereby is driven by the motion of the top end cap. A damper top 320 mounts to interior structure of the bottom end cap 120 to form a chamber around the piston 200. In a preferred embodiment and as shown in FIG. 3, the piston 200 is comprised further of a toroidal displacement body 230 and the fluid chamber is of a comparable, somewhat elongated toroidal shape. Further details of the piston are described later in reference to FIGS. 8a–8c. The fluid chamber is made complete around the toroidal displacement body 230 of the piston by the mounting of two main bellows 500, one between the piston 200 and the damper top 320 and the other between the piston 200 and the bottom end cap 120. In the embodiment 3 coil electromagnets 410 are positioned around the piston, one being positioned outside the piston's toroidal displacement body 230 between the damper top 320 and bottom end cap 120 and the other two radially interior to the toroidal displacement body within coil housings 600.

As shown in the embodiment of FIG. 3, an integral accumulator is nested within the MRFMD isolator 10. Accumulator bellows 700 and accumulator housing 830 are mounted on the interior of the bottom end cap 120. A coil spring 810 and spring adjustment screw 800 provide for accumulator and device base pressure adjustment.

An important feature of the embodiment of FIG. 3 is that the fluid volume contained within the fluid chamber is constant. This is more clearly seen in FIG. 4. The fluid volume, comprised primarily of volumes 35, 45, and 15, remains constant throughout the stroke of the piston and no volumetric accumulator, i.e. large volume absorbing accumulator, is necessary. The integral accumulator shown and described within the embodiment allows for thermal expansion of the MR fluid and for adjustment of the base pressure of the MR fluid within the device.

A further significant feature of the embodiment is that the accumulator bellows 700 and the two main bellows 500 are completely isolated from the high pressure areas within the device, those areas being volumes 35 and 45 alternating in turn with the stroke of the piston 200. Very high fluid pressures can be developed in the device around the toroidal displacement body 230 in the volume of the fluid chamber above, volume 35, and volume below, volume 45, the toroidal displacement body and bounded by the fluid gaps 25. The fluid gaps 25, in conjunction with the proximally located coils 410, effect an MR valving capability. The fluid gaps 25, through their MR valving effect and their positioning on both the outer and inner radial surfaces of the toroidal displacement body 230, allow for high fluid pressure to be built up between the toroidal displacement body and the relatively heavy cross section walls of the bottom end cap 120 and damper top 320. During piston stroking, the MR fluid forced through the fluid gaps 25 drops in pressure to the base pressure established by the integral accumulator as it passes beyond the fluid gaps 25 and into the volume 15 adjacent to the main bellows 500, that volume 15 being in fluid confluence with the integral accumulator. Further features of the piston, described later in reference to FIGS. 8a–c, minimize pressure build up of the M fluid in the fluid volume 15 adjacent to the bellows 500.

In alternate embodiments, the integral accumulator is replaced by a gas pressure accumulator or other type of accumulator means.

Figure 6:
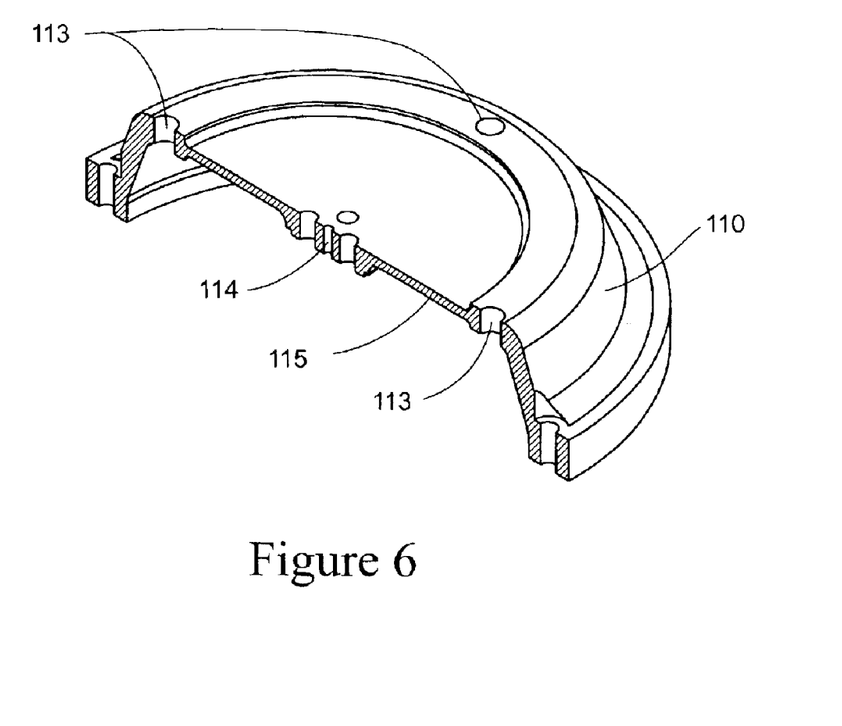
FIG. 6 is a cutaway view of a top cap comprised within the magnetorheological fluid device shown in FIG. 1 in accordance with an embodiment of the invention.
Figures 7A, 7B, 7C, 7D, 7E:
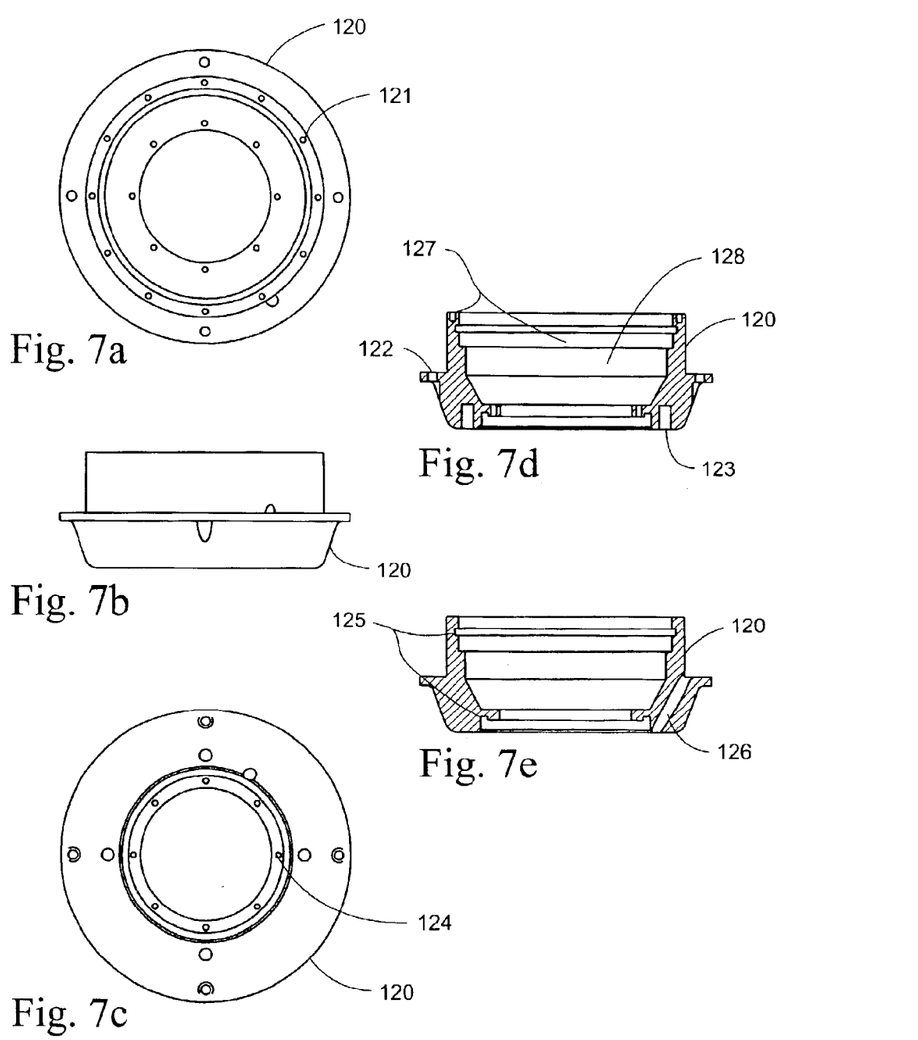
FIGS. 7a, 7b, 7c, 7d, and 7e are top, side, bottom, and two different cross section views, respectively, of a bottom cap comprised within the device of FIG. 1, in accordance with an embodiment of the invention.

FIG. 6 shows a cutaway view of the top cap 110. Top cap 110 provides through holes for mounting fasteners 111, seen in FIG. 1, for attachment of the damper piston 200 shown in detail in FIGS. 8a–c, and described later. FIGS. 1 and 2 depict fasteners 112 for mounting of the top cap to the flexure structure 130. External mounting holes 113, as seen in FIGS. 1 and 6, provide for mounting of the MRFMD isolator to the payload. Ventilation hole 114 provides for ventilation of the interior mechanical voids within the device so to avoid the trapping and compression of gases. In the embodiment shown, a flexure region 115 is formed within the top cap 110 and provides for a tuned stiffness to be added in series with the piston 200 and in parallel to the flexure structure 130.

FIGS. 7a–e show respectively the top, side, bottom, and two different cross section views of the bottom cap 120. Holes 121 provide for the attachment of the damper top 320 depicted in FIG. 10 and described later. Holes 122 provide for the attachment of the bottom cap 120 to the flexure structure 130. Holes 123 provide for mounting of the MRFMD isolator 10 to a payload support structure. Holes 124 provide for attachment of the accumulator bellows 700 depicted in detail in FIGS. 11a, 11b, and 11c and described later.

In the embodiment shown, the bottom cap 120 serves as a portion of the fluid chamber for the damping portion of the device. A cylinder wall 128 serves as the lower surface of the fluid chamber. Further, within the structure of the bottom cap 120 are two o-ring glands 125 for sealing of the magnetorheological fluid within the damper portion of the device. Mating surfaces 127 for the damper top 320 are provided. A magnet wire hole 126 is provided for allowing electric signal control to electromagnetic coils 410 comprised within the MRFMD isolator.

Figure 8A:
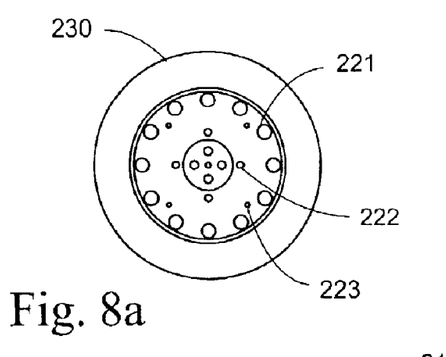
FIGS. 8a, 8b, and 8c are top, side, and cross section views of a piston comprised within the device of FIG. 1, in accordance with an embodiment of the invention.
Figure 8B:
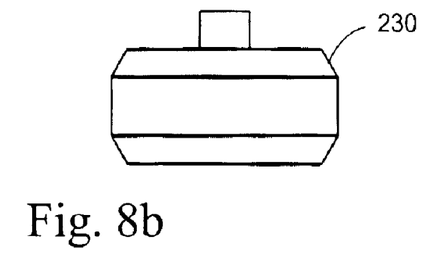
Figure 8C:
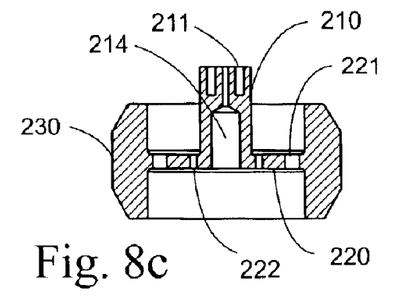

FIGS. 8a, 8b, and 8c show the top, side, and cross section views of the damper piston 200. The damper piston 200 is comprised of a connecting shaft 210 which attaches to a connecting plate 220. Connecting plate 220 in turn attaches to and supports a toroidal displacement body 230. Comprised within the connecting shaft 210 are mounting holes 211 for mounting of the piston 200 to the top cap 110 and vent hole 214. Connecting plate 220 further comprises holes 221 for minimizing magnetorheological fluid dynamic pressure across the piston in the region of main bellows 500 shown in FIG. 3. Holes 222 provide for mounting of main bellows 500 to both sides of the connecting plate 220. Fluid filling holes 223 are provided for allowing filling of the magnetorheological fluid chamber.

Figure 9:
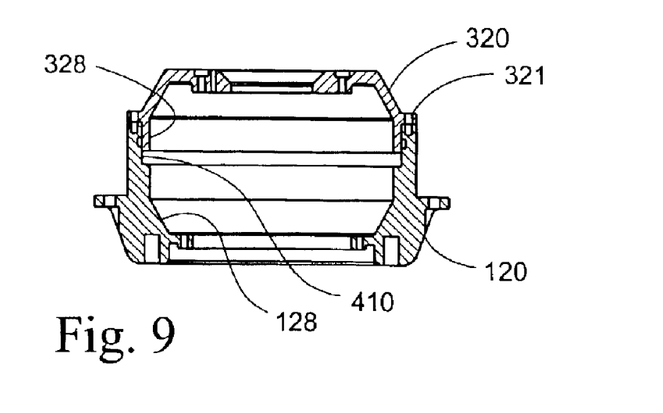
FIG. 9 shows a cross section view of a fluid chamber top mounted to a bottom cap, comprised within the device of FIG. 1, in accordance with an embodiment of the invention.

FIG. 9 shows a cross section view of the damper top 320, which serves as the fluid chamber top, mounted to the bottom cap 120, which serves as the fluid chamber bottom. The damper top 320 is further depicted in FIGS. 10a, 10b, 10c, and 10d showing top, side, bottom, and cross section views, respectively. In FIGS. 10a–d, as in FIG. 3, are shown mounting fasteners 321 which attach the damper top 320 to the bottom cap 120, as shown also in FIG. 9. Piston through hole 333 provides for the connecting shaft 210 to pass through the damper top for support of the connecting plate 220 and displacement body 230. Wire routing hole 326 provides for electrical wiring access to the interior of the device. Damper top 320 further comprises mating surfaces 327 for fluid sealing with the bottom cap 120 and cylinder wall surface 328. As shown in FIG. 9, surface 328 combines with surface 128 of the bottom cap to form the outer surface of the fluid chamber. Also shown in FIG. 9 is magnet wire coil 410, which is nested between the bottom cap and damper top. In the embodiment the damper top 320 and bottom cap 120 are both ferrous in the region of the coil 410 which allows for direction of a magnetic field across the gaps 25 between the damper top/bottom cap combination and the toroidal displacement body 230. These gaps are seen in the enlarged cross section view of FIG. 4.

Figure 10A:
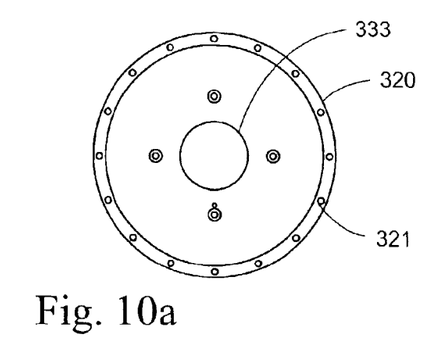
FIGS. 10a, 10b, 10c, and 10d are top, side, bottom, and cross section views, respectively, of a fluid chamber top comprised within the device of FIG. 1, in accordance with an embodiment of the invention.
Figure 10B:
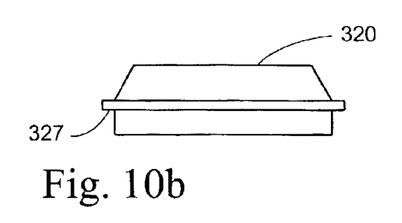
Figure 10C:
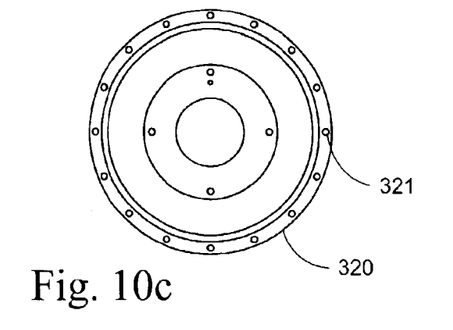
Figure 10D:
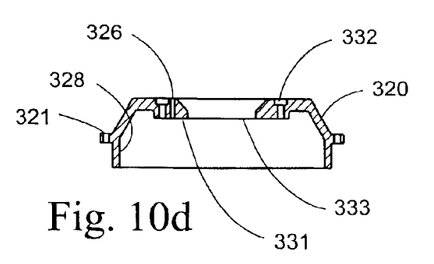
Figure 11A:
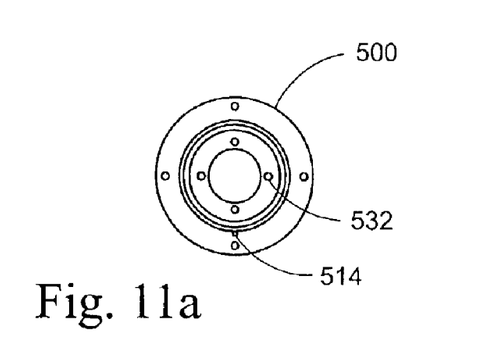
FIGS. 11a, 11b, 11c, and 11d are top, side, bottom, and cross section views, respectively, of a main bellows comprised within the device of FIG. 1, in accordance with an embodiment of the invention.
Figure 11B:
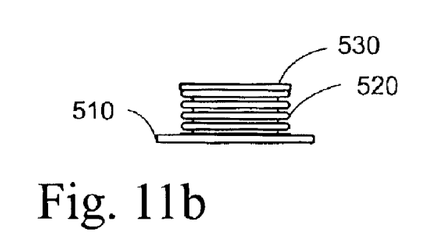
Figure 11C:
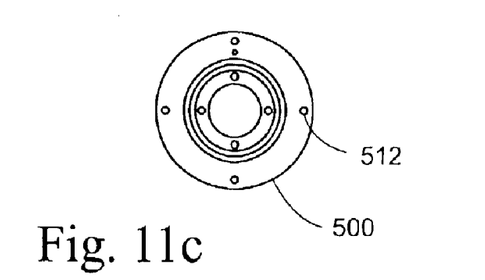
Figure 11D:
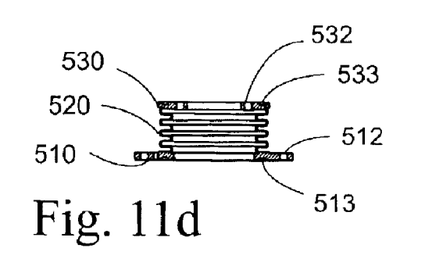
Figure 12A:
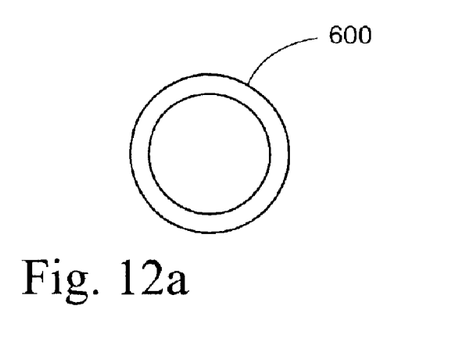
FIGS. 12a, 12b, 12c, and 12d are top, side, bottom, and cross section views, respectively, of a coil housing comprised within the device of FIG. 1, in accordance with an embodiment of the invention.
Figure 12B:
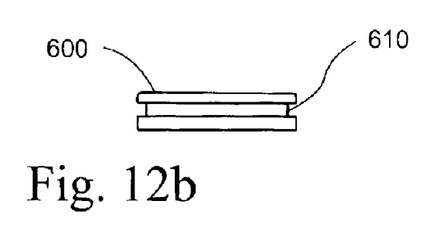
Figure 12C:
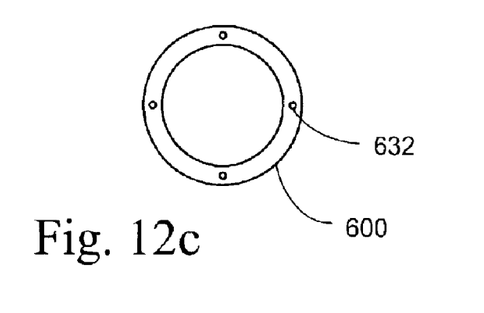
Figure 12D:
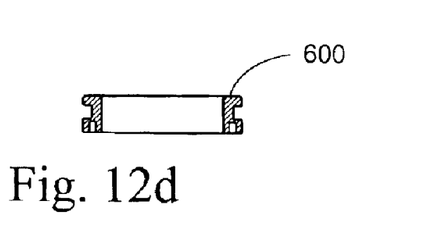

FIG. 10d shows mounting surface 331 for a main bellows 500 and mounting holes 332 for the same main bellows. The main bellows is depicted in FIGS. 11a, 11b, 11c, and 11d in top, side, bottom, and cross section views, respectively. Each bellows is comprised of first end plate 510, an edge welded metal bellows structure 520, and a second end plate 530. The first end plate comprises holes 512 for mounting to the damper top 320 or bottom cap 120 and an o-ring gland 513 for fluid sealing against the damper top or bottom cap. The second end plate 530 likewise comprises mounting holes 532 and o-ring gland 533 for mounting and sealing against the top or bottom surface of the connecting plate 220. Within the first end plate 510 are fluid filling holes 514.

FIGS. 12a, 12b, 12c, and 12d depict the top, side, bottom, and cross section views, respectively, of coil housings 600 comprised within the MRFMD isolator. A coil area 610 is centered within the coil housings 600, which are ferrous. A coil placed in the coil housing 600 thus provides for a magnetic field to be directed across the gap between the coil housings and the piston's toroidal displacement body 230.

Figure 13A:
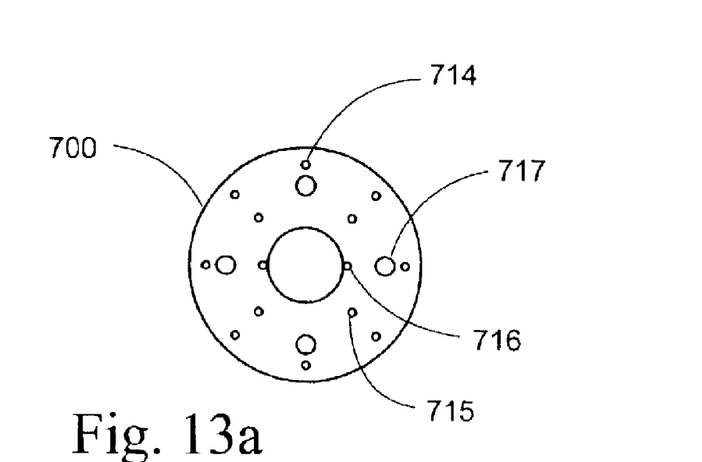
FIGS. 13a, 13b, and 13c are top, side cross section, and bottom views, respectively, of an accumulator bellows comprised within the device of FIG. 1, in accordance with an embodiment of the invention.
Figure 13B:
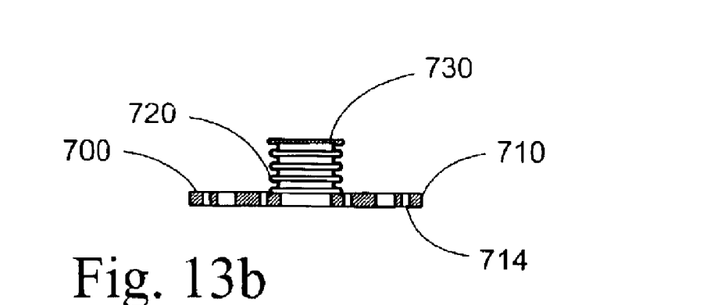
Figure 13C:
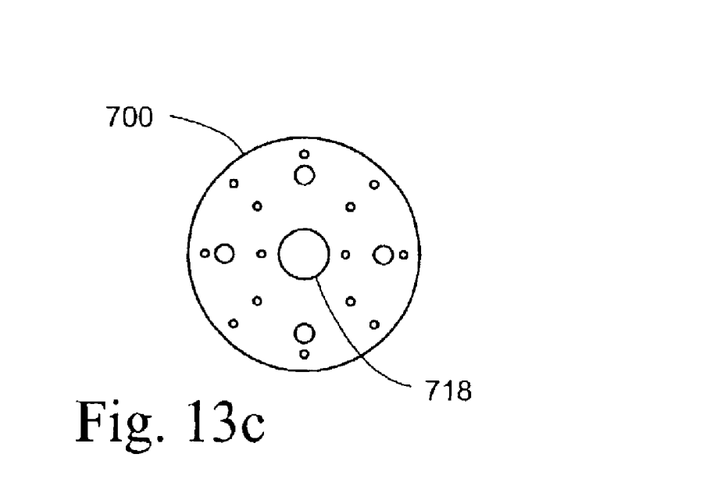

Depicted within FIGS. 13a, 13b, and 13c are top, side cross section, and bottom views, respectively, of the accumulator bellows 700 comprised within the isolation and damping device of FIG. 1, in accordance with an embodiment of the invention. The accumulator bellows 700 and an associated housing 830 (shown in FIG. 3) mounts to the bottom of the bottom cap 120. The accumulator bellows 700 is further comprised of a mounting plate 710, bellows structure 720, and end plate 730. Within the mounting plate 710 are further comprised mounting holes 714, fluid fill holes 715, air bleed holes 716, and fastener access holes 717. Mounting plate 710 also comprises a threaded hole 718 for accepting an adjustment screw 800 for varying the preload on a bellows preload spring 810, as depicted in FIG. 3.

Important features of the invention include the capture of the MR fluid above and below the toroidal displacement body portion of the piston and the avoidance of use of shaft, cylinder, or external MR fluid valves. The further provision of allowing piston motion within the MR fluid chamber without the use of dynamic seals provides an exceptionally important reliability and maintenance improvement in that the invention does not require moving seals existing in contact with the abrasive MR fluid, thereby avoiding the need for frequent seal replacement. The feature of the accumulator bellows and the two main bellows being completely isolated from the high dynamic pressure areas within the device, through the positioning of the fluid gaps on the inner and outer radius surfaces of the toroidal displacement body, combines with the above features to effect a device that is robust and reliable and capable of operation with very high fluid pressures.

As seen in FIG. 3, the fluid chamber of that embodiment is of generally elongated form of the shape of the toroidal displacement body 230 of the piston 200. Upward motion of the piston relative to the fluid chamber causes fluid on top of the toroidal displacement body to be forced to the bottom portion of the fluid chamber. Fluid gaps 25 of controlled width are effected between the outer radial surface of the toroidal displacement body and the outer annular wall of the fluid chamber and additionally so between the inner radial surface of the toroidal displacement body and the inner annular wall of the fluid chamber. Fluid volume remains constant within the fluid chamber and thus avoids the need for a volumetric accumulator. The upper and lower main bellows 500 allow piston motion relative to the fluid chamber and further eliminate the need for dynamic sealing between the piston and the fluid chamber. The positioning of the magnetic coils 410 in the walls of the fluid chamber eliminate the need for a moving coil positioned within the piston.

A particularly important and novel feature of the preferred embodiment depicted in the figures is the toroidal displacement body of the piston and the comparably shaped, elongated surrounding fluid chamber. The toroidal displacement body provides two separate paths for flow of MR fluid around the piston, and thus provides a lower viscous damping and broader damping modulation range relative to standard cylindrical piston dampers of comparable height and girth. The invention thereby obviates the need for fine passageways through the piston for enhancing damping.

The embodiment of the invention depicted provides further novel capability in the integral employment of a vibration isolation flexure within the basic structure of the device. The flexure structure, as depicted in this particular embodiment by cylindrical flexure structure 130, serves as the primary load path between a payload and the payload's support structure and is formed from high strength, linear elastic materials, such as steel, titanium, and aluminum. No elastomeric materials need be employed as is common in damping and vibration isolation devices of the prior art, though elastomerics may be added easily if so desired. The flexure structure further serves to provide complete and effective alignment of the toroidal displacement body relative to the surrounding fluid chamber. No alignment bushings are required so no friction or stiction effects are induced during operation. The flexure structure combined with the MR damping elements provide for one integrated device having a high degree of vibration isolation combined with semi-active, large damping capability without the need for separate parallel devices.

In a preferred embodiment, as shown in cutaway view FIG. 5, the flexure structure 130 is comprised of an annular wall in which are constructed multiple parallel beam flexures. The multiple parallel beam flexures are arranged such that the beam flexures are layered and arrayed in opposing pairs and the pairs are adjoined end-to-end to form a continuous ring of opposing pairs of beam flexures around the circumference of the annular wall. Further, the multiple rings of opposing pairs of beam flexures are spaced and stacked coaxially upon one another with beam ending points aligned, and additionally each ring of opposing beam pairs is connected to each adjacent ring of opposing beam pairs with supporting material located between the two rings at the midspan of each of the beam flexures that are adjacent between ring pairs.

In a further embodiment the device of FIG. 1 is fitted in parallel with a damper spring to provide a three parameter damping device.

Herewith, a magnetorheological fluid device offering vibration isolation and broad modulation range damping in a high load carrying and compact form is disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be pre-defined by the claims appended hereto and their equivalents.

What is claimed is:

1. A magnetorheological fluid device comprising:
   a piston,
   a fluid chamber, and
   at least one electromagnetic coil,
   wherein the piston is further comprised of a toroidal displacement body and the fluid chamber is of toroidal shape and encompasses the toroidal displacement body such that an upper volume is created above the toroidal displacement body and a lower volume is created below the toroidal displacement body,
   wherein a first fluid gap is effected between the upper and lower volumes and between an outer radius surface of the toroidal displacement body and an outer radius wall of the fluid chamber, and
   a second fluid gap is effected between the upper volume and a third volume and between an inner radius surface of the toroidal displacement body and an inner radius wall of the fluid chamber, and
   a third fluid gap is effected between the lower volume and the third volume and between the inner radius surface of the toroidal displacement body and the inner radius wall of the fluid chamber,
   wherein the upper and lower volumes comprise no elastomeric elements and no flexures so to effect opposing volumes capable of very high pressure,
   wherein the third volume is dynamic pressure isolated from the upper volume and lower volume by the second and third fluid gaps, and
   wherein the at least one electromagnetic coil is mounted in proximity to the fluid chamber and effects a magnetic field on the three fluid gaps between the toroidal displacement body and the fluid chamber.

2. The magnetorheological fluid device of claim 1 further comprising:
   a flexure body having a longitudinal axis and flexurally compliant in the longitudinal direction,
   a top end cap, and
   a bottom end cap
   wherein the top end cap mounts to a first longitudinal end of the flexure body and the bottom end cap mounts to a second longitudinal end of the flexure body and the lateral position of the top end cap relative to the bottom end cap is maintained by the flexure body,
   and wherein the piston is mounted to the top end cap and the fluid chamber is mounted to the bottom end cap such that the first and second and third fluid gaps are maintained through the lateral position of the top end cap relative to the bottom end cap being maintained by the flexure body.

3. The magnetorheological fluid device of claim 2 wherein the piston further comprises a connecting plate which connects the toroidal displacement body to a piston shaft and wherein the magnetorheological fluid device further comprises a first and second main bellows wherein the first main bellows connects between the connecting plate and an upper portion of the fluid chamber and the second main bellows connects between the connecting plate and a lower portion of the fluid chamber such that the first and second main bellows seal the fluid chamber around the toroidal displacement body and allow for relative motion between the piston and fluid chamber.

4. The magnetorheological fluid device of claim 3 wherein the position of the second and third fluid gaps isolate the first and second main bellows from high dynamic fluid pressures developed within the upper and lower volumes of the fluid chamber.

5. The magnetorheological fluid device of claim 3 wherein the connecting plate is further comprised of pressure minimization holes such that fluid pressure across the connecting plate is minimized during piston motion.

6. The magnetorheological fluid device of claim 3 wherein the flexure body is a cylindrical construction of multiple parallel beam flexures of linear-elastic high-strength material.

7. The magnetorheological fluid device of claim 3 wherein the at least one electromagnetic coil is comprised of a first coil mounted in the outer radius wall of the fluid chamber and of a second and third coil each mounted in a ferrous coil housing attached in proximity to the inner radius wall of the toroidal displacement body.

8. The magnetorheological fluid device of claim 3 further comprising an accumulator bellows, a bellows spring, a bellows spring adjustment screw, and an accumulator housing nested within the bottom end cap and fluid connected to the fluid chamber such to effect a magnetorheological fluid pressure regulating accumulator.

9. The magnetorheological fluid device of claim 3 wherein the top end cap further comprises payload mounting holes and piston mounting holes and a flexure between the piston mounting holes and payload mounting holes such that a tuned stiffness can be achieved in series with the piston.

10. The magnetorheological fluid device of claim 3 further comprised of at least one venting hole such that the magnetorheological fluid device develops no compressed gases when placed into a vacuum environment.

11. A vibration damping and isolation apparatus comprising:
a cylindrically shaped flexure structure,
a bottom cap attached to a first end of the cylindrically shaped flexure structure,
a top cap attached to a second end of the cylindrically shaped flexure structure,
a piston further comprising a toroidal displacement body, a central shaft, and a connecting plate connecting the toroidal displacement body to the central shaft,
a damper top attached to the bottom cap,
a first main bellows attached between the bottom cap and the connecting plate,
a second main bellows attached between the damper top and the connecting plate wherein the damper top, bottom cap, first main bellows and second main bellows form a fluid chamber surrounding the toroidal displacement body and wherein the first and second main bellows allow frictionless motion of the toroidal displacement body relative to the fluid chamber,
and a coil in proximity to the toroidal displacement body,
wherein the fluid chamber is filled with magnetorheological fluid,
wherein the cylindrically shaped flexure structure allows for longitudinal motion of the top cap relative to the bottom cap which in turn induces longitudinal motion of the toroidal displacement body relative to the fluid chamber and causes the toroidal displacement body to displace magnetorheological fluid through a first gap between the fluid chamber and an outer radius of the displacement body and through a second gap between the fluid chamber and an inner radius of the toroidal displacement body,
and wherein the viscosity of the magnetorheological fluid is varied by varying electrical current supplied to the coil.

12. The vibration damping and isolation apparatus of claim 11 wherein the lateral position of the toroidal displacement body relative to the fluid chamber is completely maintained by the cylindrically shaped flexure structure.

13. The vibration damping and isolation apparatus of claim 11 further comprising an accumulator wherein the accumulator is fluid connected to the fluid chamber and wherein the accumulator is chargeable to a desired pressure for maintaining a constant pressure within the fluid chamber.

14. The vibration damping and isolation apparatus of claim 13 wherein the accumulator is comprised of an accumulator bellows internally supported by a bellows spring such that fluid pressure surrounding the bellows is modulated by the compression force in the spring and the compression force in the spring is controllable by a bellows adjustment screw wherein the bellows adjustment screw may be turned inward to increase the compression force within the bellows spring such to effect a higher accumulator fluid pressure.

15. The vibration damping and isolation apparatus of claim 14 wherein the first and second gaps serve as magnetorheological fluid valves such that the accumulator bellows and first and second main bellow are isolated from high dynamic fluid pressures developed within the fluid chamber.

16. A vibration isolator comprising:
a flexure body,
a fluid chamber filled with magnetorheological fluid,
a piston, and
at least one electromagnetic coil,
wherein the piston is mounted with a first attachment means to a first longitudinal end of the flexure body and the fluid chamber is mounted with a second attachment means to a second longitudinal end of the flexure body such that the lateral position of the piston relative to the fluid chamber is controlled by the lateral stiffness of the flexure body and longitudinal motion of the piston relative to the fluid chamber is provided for by longitudinal compliance in the flexure body, and wherein the piston is further comprised of a toroidal displacement body and the fluid chamber is of toroidal shape and encompasses the toroidal displacement body such that a first fluid gap exists between an outer radius surface of the toroidal displacement body and an outer radius wall of the fluid chamber and a second fluid gap exists between an inner radius surface of the toroidal displacement body and an inner radius wall of the fluid chamber,
and wherein the at least one electromagnetic coil is further comprised of first and second electromagnetic coils wherein the first electromagnetic coil is mounted into the outer radius wall of the fluid chamber and the second electromagnetic coil is mounted into the inner radius wall of the fluid chamber and each coil effects a magnetic field on the fluid gaps between the toroidal displacement body and the fluid chamber.

17. The vibration isolator of claim 16 wherein the flexure body is further comprised of an annular wall of high strength, linear elastic material, wherein in the annular wall are constructed multiple parallel beam flexures wherein the multiple parallel beam flexures are arranged such that the beam flexures are layered and arrayed in opposing pairs and the pairs are adjoined end-to-end forming a continuous ring of opposing pairs of beam flexures around the circumference of the annular wall, and such that the multiple rings of opposing pairs of beam flexures are spaced and stacked coaxially upon one another with beam ending points aligned, and such that a first ring of opposing beam pairs is connected to an adjacent second ring of opposing beam pairs with supporting material located between the two rings at the midspan of each of the beam flexures that are adjacent between ring pairs, and such that all remaining rings of opposing beam flexures are thusly connected.

* * * * *